G. M. WALKER.
BASKET.
APPLICATION FILED APR. 22, 1918.
1,308,824.
Patented July 8, 1919.
2 SHEETS—SHEET 2.
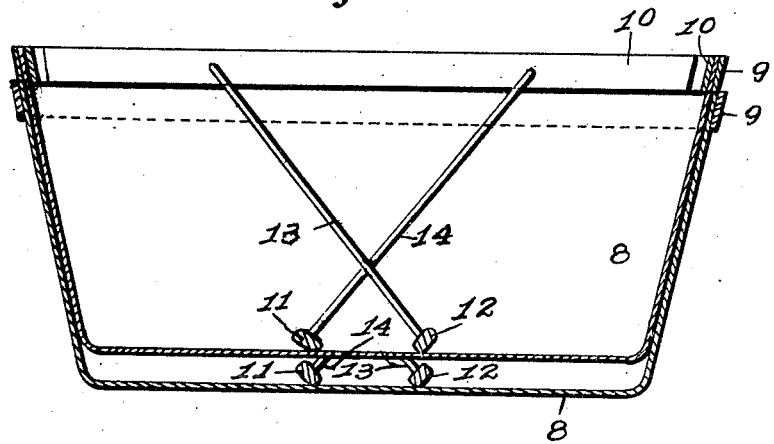
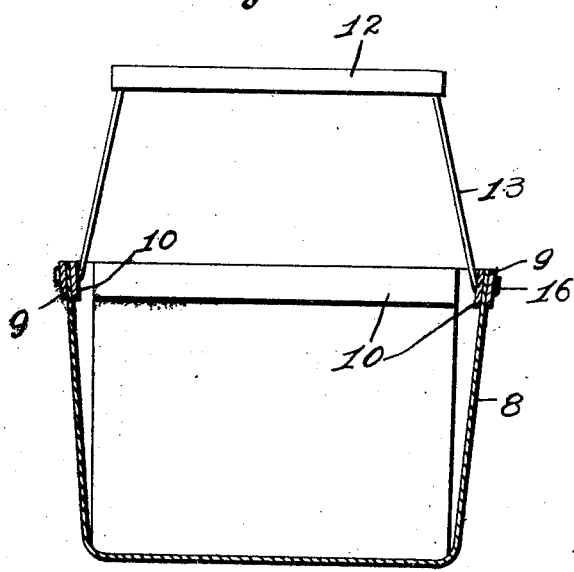
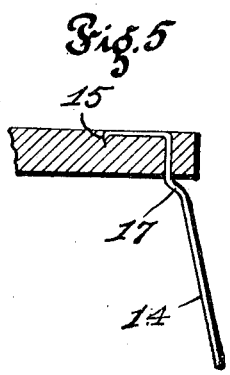
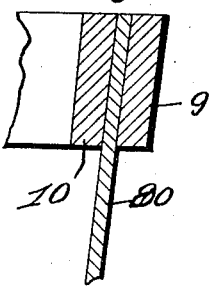
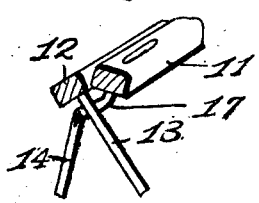
Inventor
Gaines M. Walker
by Edward S. Longan
Atty.

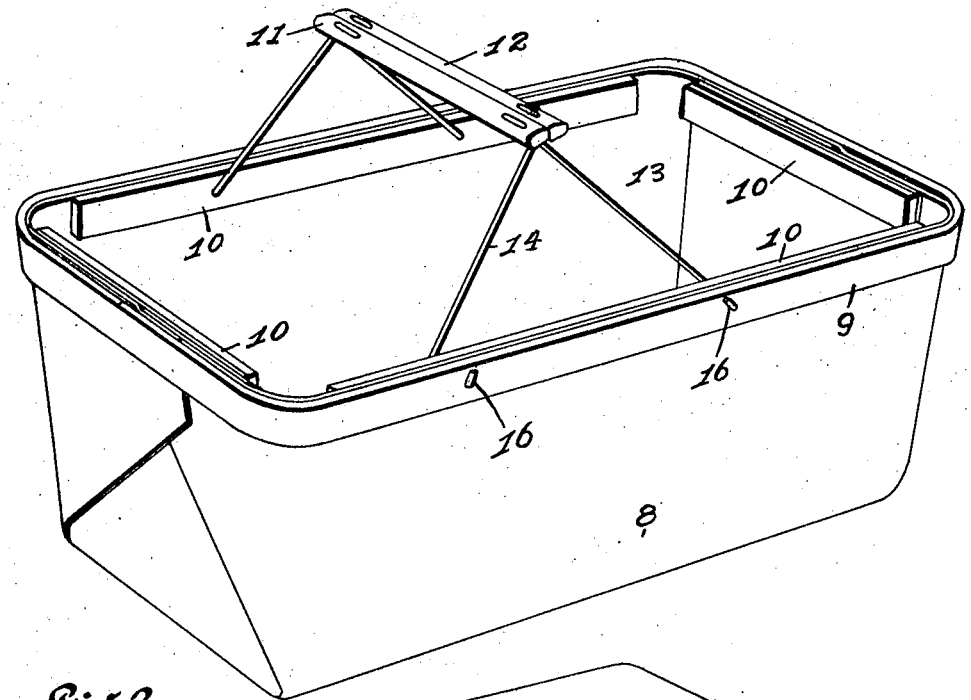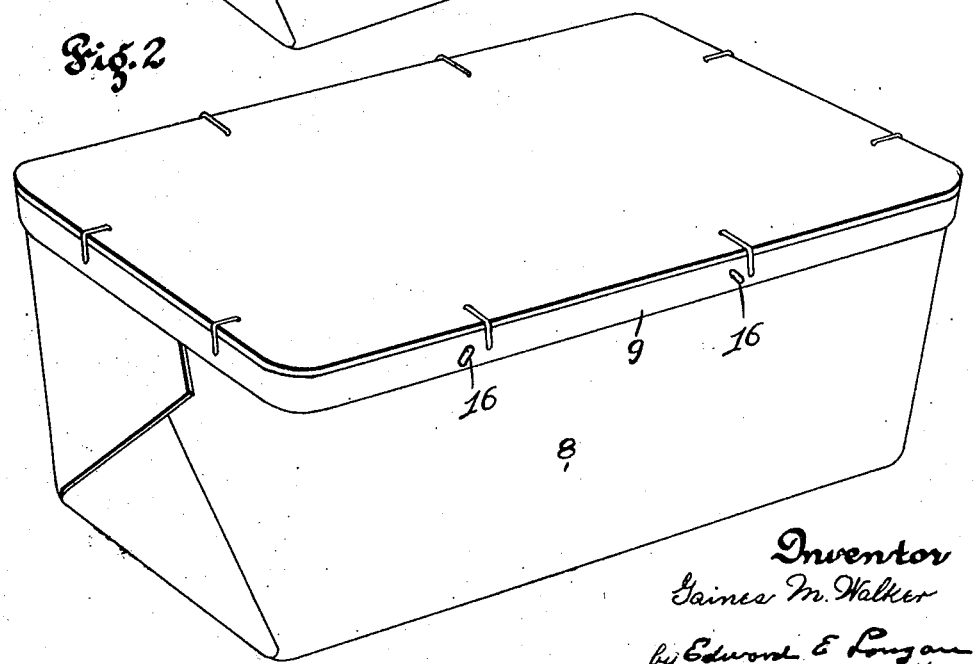

UNITED STATES PATENT OFFICE.

GAINES M. WALKER, OF ST. LOUIS, MISSOURI.

BASKET.

1,308,824.  Specification of Letters Patent.  Patented July 8, 1919.

Application filed April 22, 1918. Serial No. 230,111.

*To all whom it may concern:*

Be it known that I, GAINES M. WALKER, a citizen of the United States, and resident of St. Louis, and State of Missouri, have invented certain new and useful Improvements in Baskets, of which the following is a specification containing a full, clear, and exact description, reference being had to the accompanying drawings, forming a part hereof.

My invention relates to certain new and useful improvements in "baskets" and has for its special object the construction of a handle for carrying the basket which may be folded on the inside of the basket so that the empty baskets may be nested, and may be folded out of the way when the basket is filled with contents so that a lid may be applied to same in shipping.

In the drawings,

Figure 1 is a perspective view of a basket showing my invention applied thereto.

Fig. 2 is a perspective view of a basket with a lid attached wherein the handles are folded down out of the way for the attachment of a lid.

Fig. 3 is a longitudinal section of one basket nested within another and illustrating my invention applied thereto.

Fig. 4 is a transverse section of a basket illustrating one of the handles applied thereto.

Fig. 5 is a sectional view of a portion of the handle showing the method of attaching the handle to the handle wires.

Fig. 6 is an enlarged transverse section taken through the rim of the basket, and Fig. 7 is a perspective view illustrating the means of locking the handles together, parts of the handles and handle wires being broken away.

Referring to the drawings 8 indicates a basket which is make out of wood veneer and is provided on the outside with a continuous reinforcing rim 9 and on the inside with sectional reinforcing rims 10. These rims are applied to the top edge of the basket proper in any suitable mechanical manner.

11 and 12 indicate the basket handles, the handle 11 being pivotally secured to the basket by means of wire rods 13, and the handle 12 being pivotally secured to the basket by means of wires or rods 14.

In Fig. 5 I have shown the method of securing the wires to the handles which consists in driving the wires through the handles, then bending the same downwardly on top of the handles and finally inserting the bended ends 15 into the handles.

The wires 13 and 14 are secured to the basket by means of passing the lower ends through the inside reinforcing strips 10 and outside reinforcing strip 9 and then bending the ends upwardly as at 16. By this means the wires 13 and 14 are pivotally secured to the basket, and are secured to the basket between the center and ends thereof.

Both handles 11 and 12 are shorter than the width of the basket and are adapted to be folded downwardly into the bottom of the basket as illustrated in Fig. 3.

The handle wires 13 are positioned on the outside of the handle wires 14. In other words, the handle wires 14 are adapted to be folded downwardly between the handle wires 13, that is, when the basket handles 11 and 12 are folded down in the bottom of the basket as illustrated in Fig. 3.

When the handles 11 and 12 are elevated for use as illustrated in Fig. 1 the wires 13 are folded or lie outside the handle wires 14. Each of the handle wires 14 are provided near their upper ends and near the handle which is secured to them with inwardly extending bends or seats 17 into which the wires 13 seat when the handles are brought together, as illustrated in Fig. 1. By this construction the handles may be temporarily fastened together and when it is desired to separate them for the purpose of folding them downwardly within the basket, a slight pull on the handles will separate them and permit them to be folded downwardly into the basket as illustrated in Fig. 3. It is obvious, that by so constructing and mounting the handles they may be folded downward on the inside of the basket so that empty baskets may be nested into each other. If it is desired to place contents into the basket for shipping purposes the handles are folded down on the inside of the basket and the contents placed around them, and a lid may be secured to the basket as illustrated in Fig. 2, and further by such construction the handles may be folded out of the way as occasion may require.

By mounting the handles between the ends of the basket and its center also prevents the basket from tilting should it have a greater load in one end than in the other.

By reference to Fig. 1 it will be seen that if the load in the basket is in one end its weight will be distributed, for instance, if the load is in the end of the basket to the right in Fig. 1 there will be tension applied to the wires 13 and compression on the wires 14 which will distribute the load to the handles 11 and 12 which are in the center of the basket when the handles are in use.

By providing the outside of the basket with a continuous reinforcing strip 9 and inside reinforcing strips 10, the handle wires 13 and 14 may be firmly secured to the basket. These reinforcing strips prevent the basket from tearing or splitting where the handle wires are secured to it.

The handle wires 13 and 14 may be formed out of any suitable wire and may be readily applied to the basket and to the handles 11 and 12. It will be observed that the distance between the wires or arms 14 where they are secured to the basket is greater than the distance between them where they are secured to the handle 12. The same is likewise true of the wires or arms 13. This is for the purpose of forming the wires or arms to pass each other in folding the handles downwardly into the bottom of the basket when not in use and in folding them for use as illustrated in Fig. 1.

Having fully described my invention, what I claim is:

1. A basket comprising a body portion, a reinforcing strip secured to the top edge thereof, a pair of stiff handles each of which is pivotally secured on the inside of said basket and passing through the reinforcing strip at a point between the center and the end of the basket, the said wire handles adapted to be folded downwardly away from and toward each other in the bottom of the basket, when the handles are out of use, and to be folded upward, toward and in contact with each other when said handles are in use, said handles when folded down and out of use lie wholly on the inside of the basket and in contact with the bottom thereof.

2. The combination with a basket provided with an inside and outside reinforcing strip, of a pair of stiff wire handles, each of which is pivoted to the basket on its inside through the reinforcing strips between the center and end of the basket, said handles being capable of being folded upwardly within the basket when not in use and to be swung downwardly in contact with each other when in use, and an interlocking connection between the handles affording a temporary locking connection between the wire handles when in use.

3. A handle for baskets and the like comprising two pairs of handle arms and a stiff handle connecting the upper ends thereof, each pair of handle arms being pivotally secured to the basket between its center and end, one pair of handle rods being provided with a bent portion forming a locking seat for the other pair of handle arms for securing the handles together when in use, said handles and handle arms adapted to be folded within the basket.

In testimony whereof, I have signed my name to this specification in the presence of two subscribing witnesses.

GAINES M. WALKER.

Witnesses:
EDWARD E. LONGAN,
WALTER C. STEIN.